US006859751B2

(12) United States Patent
Cardarelli

(10) Patent No.: US 6,859,751 B2
(45) Date of Patent: Feb. 22, 2005

(54) PLANAR INERTIAL MEASUREMENT UNITS BASED ON GYROS AND ACCELEROMETERS WITH A COMMON STRUCTURE

(75) Inventor: Donato Cardarelli, Medford, MA (US)

(73) Assignee: Milli Sensor Systems & Actuators, Inc., West Newton, MA (US)

( * ) Notice: Subject to any disclaimer, the term of this patent is extended or adjusted under 35 U.S.C. 154(b) by 8 days.

(21) Appl. No.: 10/321,774

(22) Filed: Dec. 17, 2002

(65) Prior Publication Data

US 2003/0216884 A1 Nov. 20, 2003

Related U.S. Application Data

(60) Provisional application No. 60/341,312, filed on Dec. 17, 2001.

(51) Int. Cl.[7] ........................... G01P 15/00; G01C 19/00
(52) U.S. Cl. ..................... 702/141; 702/145; 73/504.12
(58) Field of Search ................................ 702/141, 145; 73/504.02, 504.03, 504.04, 504, 12

(56) References Cited

U.S. PATENT DOCUMENTS 3,945,646 A * 3/1976 Hammond .................. 473/223
6,122,961 A * 9/2000 Geen et al. ............... 73/504.12
6,474,160 B1 * 11/2002 Stewart et al. ........... 73/504.04

* cited by examiner

*Primary Examiner*—John Barlow
*Assistant Examiner*—Meagan S Walling
(74) *Attorney, Agent, or Firm*—Brian M. Dingman, Esq.; Mirick O'Connell, DeMallie & Lougee, LLP

(57) ABSTRACT

Inertial Measurement Units based on integrated designs to reduce alignment and assembly costs. Integration also leads to performance improvement, increased miniaturization and simplification as well as reduced cost. Also disclosed are gyroscopes and accelerometers that are identical, yet by their mechanization, can be made to act as separate sensors. Miniaturization and simplification is improved by combining instruments that can share a common member. Savings in space and complexity are also possible in the electronics when elements are shared.

49 Claims, 12 Drawing Sheets

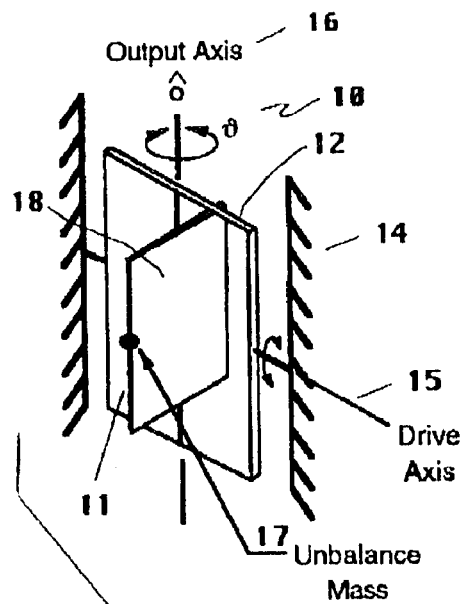
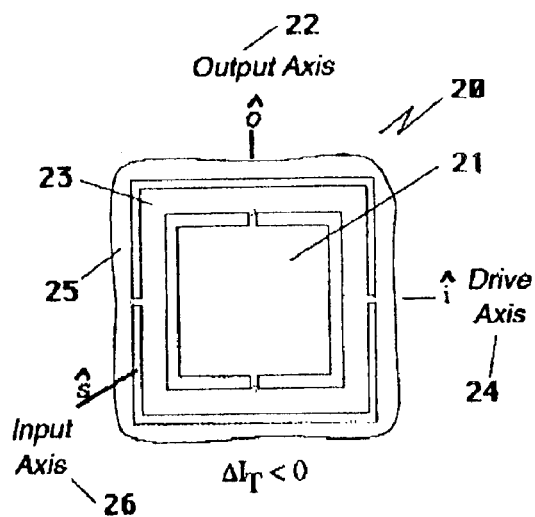
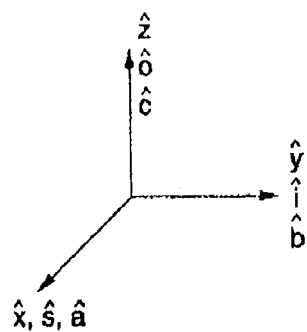
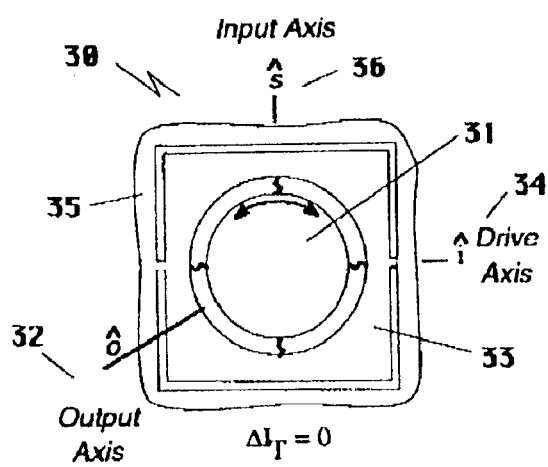
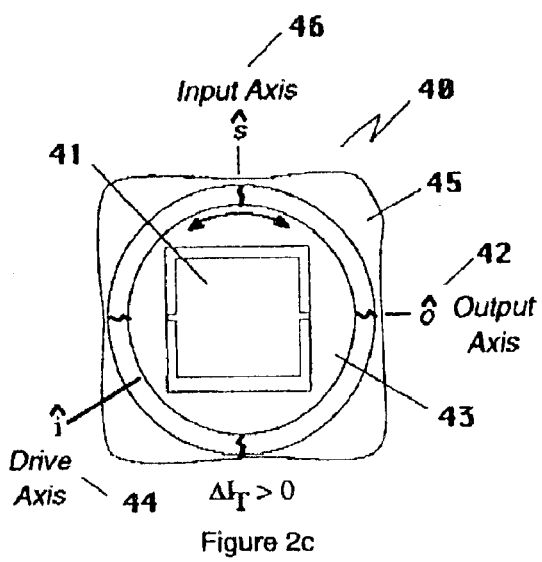
Figure 1
Figure 2a
Figure 2b
Figure 2c

PLANAR INERTIAL MEASUREMENT UNITS BASED ON GYROS AND ACCELEROMETERS WITH A COMMON STRUCTURE

CROSS REFERENCE TO RELATED APPLICATION

This application claims priority of Provisional Application Ser. No. 60/341,312, filed on Dec. 17, 2001.

STATEMENT OF FEDERALLY SPONSORED RESEARCH AND DEVELOPMENT

This invention was made with Government support under contract numbers N00014-00-M-0119 awarded by ONR and DASG60-99-M-0089 awarded by the Air Force. The Government has certain rights in the invention.

BACKGROUND OF THE INVENTION

Inertial Measurement Units (IMUs) measure the motion of a body in six degrees of freedom using a set of gyroscopes and accelerometers with input axes aligned with three orthogonal axes. The instruments are typically self-contained devices with electronics and a package. Each instrument is tested prior to use in an IMU. The instruments are then assembled with the proper alignment onto a stable member of the system. With expensive high performance IMUs, the cost associated with this approach may be acceptable. However, with miniature, low cost instruments having correspondingly lower performance, the approach is not cost effective. The solution is to make use of integrating technologies such as Microelectromechanical Systems (MEMS) to fabricate all the instruments at the same time on one substrate to produce an IMU in one package. The testing will be done at the IMU level. In addition to cost and size reduction, integration provides benefits that improve performance. The practicality of integration, though, depends on the proper choice of instrument designs.

SUMMARY OF THE INVENTION

This invention relates to the design and fabrication of integrated, planar inertial measurement units (IMUs) based on planar gyroscopes and accelerometers having a common structure. The common structure is the key to a simpler structural design that is easier to build resulting in high fabrication yield without which integration is not possible. The common structure also simplifies the functional design resulting in improved performance. MEMS integration benefits performance because it prevents tolerance build-up that occurs with the assembly of separate parts to form the whole. With the absence of tolerance build-up, errors due to uncertainty are reduced and instrument stability improved.

This invention also relates to gyroscope and accelerometer designs based on the common structure. A set of gyroscopes and accelerometers results that becomes the basis from which various IMUs can be designed depending on the application and performance requirements.

Because of the common structure, instruments can also be structurally combined by sharing a common member to produce sets of instruments that are smaller, require less electronics and perform better. Two-instrument sets can be formed from which various IMUs can be designed. Three-instrument sets, four-instrument sets, etc. can also be formed from which IMU designs can be formed.

Generally an Inertial Measurement Unit (IMU) can contain any number of gyroscopes and accelerometers. The typical IMU is a six degree-of-freedom (DOF) design containing three single DOF gyroscopes and three single DOF accelerometers. However some applications do not require the measurement of six degrees of freedom and therefore a lower number of instruments will suffice. It is also true in the case of the six DOF IMU, that more than three gyroscopes and three accelerometers can be used. That is because integration allows more sophisticated designs to be configured whereby additional instruments are added to build-in redundancy or to differentially (with pairs of instruments) remove common mode errors, etc. Various combinations of gyroscopes and accelerometers will occur to those skilled in the art of IMU design.

Several Considerations Apply that Drive the Integrated IMU Design

Consideration1—MEMS integration is essential to achieving the best performance in a miniature IMU.

Consideration2—MEMS gyroscopes and accelerometers based on a common structure reduce the requirements on fabrication processes thereby improving yield without which an Integrated IMU is not possible.

Consideration3—MEMS gyroscopes and accelerometers based on the common structure simplify the IMU design.

Consideration4—Standard gyroscope and accelerometer designs form the basis for designing various IMUs.

Consideration5—An integrated IMU makes the most efficient use of space resulting in the smallest size.

Consideration6—An integrated IMU requires one package that provides a common environment for all instruments.

BRIEF DESCRIPTION OF THE DRAWINGS

Other objects, features and advantages will occur to those skilled in the art from the following descriptions of the preferred embodiments, and the accompanying drawings, in which:

FIG. 1 is a stick figure of the conceptual common structure.

FIGS. 2a, 2b, 2c are conceptual renditions of three prospective planar gyroscope configurations possible from the common structure.

Figure 3:
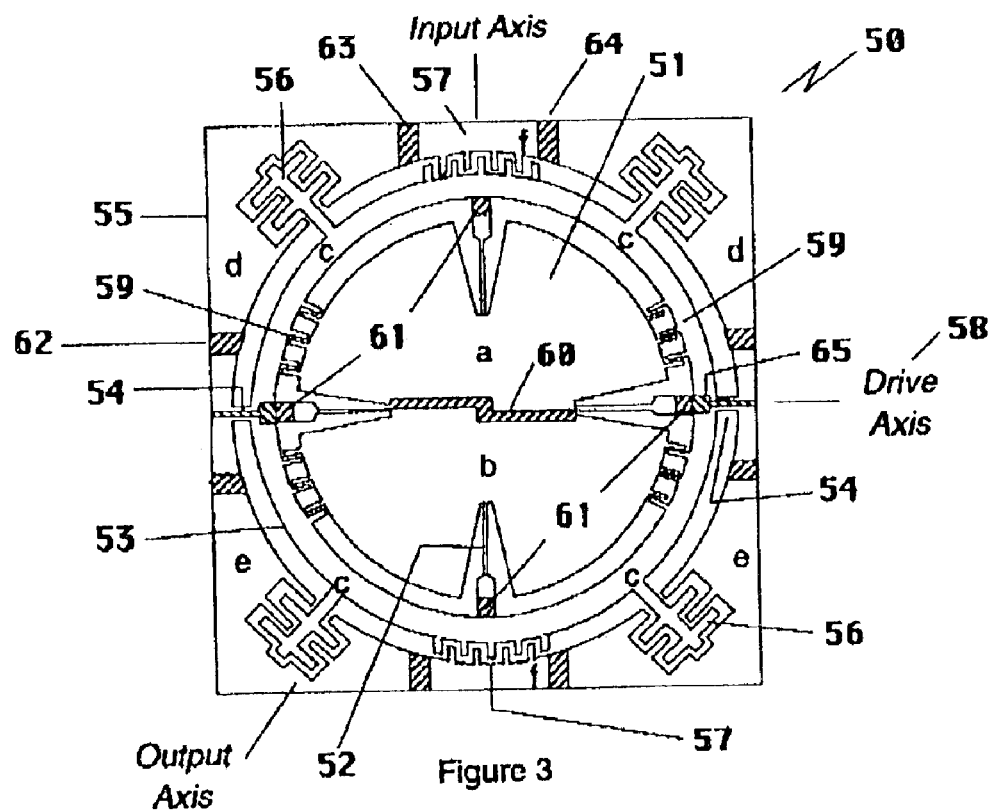
FIG. 3 is a conceptual rendition of a planar gyroscope based on the second configuration (FIG. 2b) mechanized with capacitive comb drives and comb pick-offs.

A six degree-of-freedom (DOF) IMU traditionally refers to three gyros and three accelerometers combined on a common member. The instruments are aligned to measure rotations about three orthogonal axes and accelerations along three orthogonal axes. Other six DOF IMU configurations are possible with a different combination of gyroscopes and accelerometers. Additional instruments may be added to improve performance.

DESCRIPTION OF THE PREFERRED EMBODIMENTS OF THE INVENTION

Introduction

This invention applies to the design and fabrication of a planar integrated IMU using principally MicroElectroMechanical Systems (MEMS) technology. Other planar technologies may be applicable. To simplify fabrication and to enable all instruments to be fabricated on one substrate (chip), the gyroscope and accelerometer designs are based on a common structure. The common structure can be described with common analysis. An IMU based on common instruments will reduce development time and risks associated with the development of different instruments.

This invention also applies to the design and fabrication of the planar gyroscopes and accelerometers that are based on the common structure.

This invention also applies to the design and fabrication of instrument sets based on instruments that share a common member.

Common Structure

The common structure 10 is illustrated in stick form in FIG. 1. It comprises an inner member 11 that is flexurally connected to an outer member 12 that is in turn flexurally connected to the case 14. Two sets of flexures define orthogonal axes of rotation for the inner and outer members, respectively. For the gyroscope and for the accelerometer, the outer member is driven into sinusoidal oscillation about the Drive Axis 15. For the gyroscope, the inner member is the sense member that responds to gyroscopic torque by oscillating about the Output Axis 16 at the same frequency as the outer drive member, but at an amplitude that is proportional to rotation rate. For the accelerometer, an unbalance mass 17 is added to the inner member converting it into a pendulum 18. The pendulum responds to acceleration by rotating about the Output Axis.

Three sets of co-ordinate frames (FIG. 1) are needed to describe instrument operation. The s,i,o co-ordinate frame rotates with the inner sense member about the Output Axis by angle $\vartheta$. The x,y,z co-ordinate frame oscillates sinusoidally with the outer drive member about the Drive Axis with angle $\phi = \tilde{\phi} \sin\omega t$ where $\tilde{\phi}$ and $\omega$ are the oscillation amplitude and frequency respectively. The a,b,c co-ordinate frame rotates in inertial space with the case and vehicle (strapdown implementation).

Analysis of the Common Structure

The dynamics of the common structure are governed by the equation of motion for the inner sense member.

$$I_{So}\ddot{\vartheta} + D_S\dot{\vartheta} + \tag{1}$$

$$\left[ K_S + \left\{ (\Omega_b^2 - \Omega_a^2) + \frac{1}{2}(\omega^2 - \Omega_c^2)\tilde{\phi}^2 - 2\Omega_a\Omega_c\tilde{\phi}\sin\omega t + 2\Omega_b\tilde{\phi}\omega\cos\omega t \right\} \right.$$

$$\left. \Delta I_S \right]\vartheta - (\Omega_a\Omega_b + \Omega_a\Omega_c\tilde{\phi}\sin\omega t + \Omega_a\tilde{\phi}\omega\cos\omega t)\theta^2 =$$

$$I_{So}\Omega_a\tilde{\phi}\omega\cos\omega t - \Delta I_S(\Omega_a\Omega_b + \Omega_b\Omega_c\tilde{\phi}\sin\omega t + \Omega_a\tilde{\phi}\omega\cos\omega t) +$$

$$\tau_p - \tau_{rebalance}$$

where
$I_{So}$ inner sense member moment of inertia about the o-axis (Output Axis).
$D_S$ inner sense member damping.
$K_S$ inner sense member flexure stiffness.
$\vartheta$ rotation angle of the inner sense member relative to the drive member
$\tilde{\phi}$ rotation angle amplitude of the drive member relative to the case.
$\Omega_a, \Omega_b, \Omega_c$ rotation rates of the case in inertial space about three orthogonal axes.
$\Delta I_S = I_{Si} - I_{Ss}$ inertia difference of the inner sense member inertias about the i-axis and s-axis (tuning inertia).

To the left of the equals sign in Equation (1) are included the usual torque terms dependent on inertia, damping and stiffness as well as a nonlinear term dependent on inner sense member angle of rotation. The stiffness term is dependent on vehicle rotation rates $\Omega_a, \Omega_b, \Omega_c$, outer member oscillation frequency $\omega$ and a factor referred to as the tuning inertia, $\Delta I_S$ as shown in the following equation.

$$\left[ K_S + \tag{2} \right.$$

$$\left. \left\{ (\Omega_b^2 - \Omega_a^2) + \frac{1}{2}(\omega^2 - \Omega_c^2)\tilde{\phi}^2 - 2\Omega_a\Omega_c\tilde{\phi}\sin\omega t + 2\Omega_b\tilde{\phi}\omega\cos\omega t \right\} \Delta I_S \right]$$

To the right of Equation (1) are included torque terms that drive the inner sense member. They include:

$I_{So}\Omega_a\tilde{\phi}\omega \cos\omega t$ gyro torque for case rotation about the a-axis.

$\Delta I_S(\Omega_a\Omega_b + \Omega_b\Omega_c\tilde{\phi} \sin\omega t + \Omega_a\tilde{\phi}\omega \cos\omega t)$ torque related to the inner sense member tuning inertia.

$\tau_{rebalance}$ rebalance torque to maintain the inner sense member at null.

$\tau_p$=Pa pendulous torque applied to the inner sense member by acceleration, a, acting on pendulosity, P.

Gyroscope Mechanization

Three single-degree-of-freedom (SDF) planar gyroscope configurations are possible to consider from the common structure described by the stick figure of FIG. 1. They are shown in FIGS. 2a, 2b, 2c. The gyroscope configurations are distinguished by the orientations of the Drive Axis (i), Output Axis (o) and Input Axis (s) and the motion of the inner and outer members relative to the plane.

For the first gyroscope configuration 20, FIG. 2a, the inner sense member 21 rotationally oscillates in and out of the plane about the Output Axis 22 by angle $\vartheta$ relative to the outer drive member 23. The outer drive member is rotationally oscillated in and out of the plane about the Drive Axis 24 by angle $\phi$ relative to the case 25. As the outer member is driven, the inner sense member is also driven relative to the case. The Drive and Output Axes are in the plane and orthogonal to each other. The Input Axis 26 is expected to be normal to the plane.

For the second gyroscope configuration 30, FIG. 2b, the inner sense member 31 rotationally oscillates about the Output Axis 32 that is normal to the plane by angle θ relative to the outer drive member 33. The outer drive member is rotationally oscillated in and out of the plane about the Drive Axis 34 by angle φ relative to the case 35. As the outer member is driven, the inner sense member is also driven relative to the case. The Drive and Input Axes are in the plane and orthogonal to each other. Rotation Rate is measured about the Input Axis 36.

For the third gyroscope configuration 40, FIG. 2c, the inner sense member 41 rotationally oscillates in and out of the plane about the Output Axis 42 by angle ϑ relative to the outer drive member 43. The outer drive member is rotationally oscillated about the Drive Axis 44 that is normal to the plane by angle φ relative to the case 45. As the outer member is driven, the inner sense member is also driven relative to the case. The Input and Output Axes are in the plane and orthogonal to each other. Rotation rate is measured about the Input Axis 46.

The gyroscope of the second configuration is appealing because zero tuning inertia, $\Delta I_S = 0$, can be realized by in-plane symmetry of the inner sense member. The benefit is the elimination of sensitivity to input rates about orthogonal axes as can be seen from the simplified equation of motion. The equation of motion becomes $$I_{So}\ddot{\vartheta} + D_S\dot{\vartheta} + K_S\vartheta - (\Omega_a\Omega_b + \Omega_a\Omega_c\phi \sin \omega t + \Omega_a\phi\omega \cos \omega t)\vartheta^2 = I_{So}\Omega_a\phi\omega \cos \omega t \quad (3)$$

where the non-linear term in $\vartheta^2$ is further ignored because the output angle is typically very small. The second configuration enables a good strap-down gyro. To obtain maximum gyroscope response and therefore maximum oscillation amplitude of the inner sense member, $\vartheta_{Max}$, the inner and outer member resonance frequencies are matched.

$$\vartheta_{Max} = \frac{I_{So}}{D_{So}}\phi\Omega_a \quad (4)$$

A practical gyroscope however may be operated with a small offset between resonance frequencies. Typically the outer member is driven at resonance to minimize power consumption and the inner member responds off-resonance at the outer member frequency. The resonance frequencies are set by the stiffness of the flexures and inertia of the members. The outer member oscillation amplitude is held constant so that the output per given rotation rate is constant (constant scale factor).

A gyroscope embodiment based on the second configuration 50 is illustrated in FIG. 3. The inner sense member 51 is connected with four radial flexures 52 to the outer drive member 53 (ring shaped). The outer drive member is connected with a pair of torsional flexures 54 to the case 55. Drive comb actuators 56 oscillate the ring in and out of the plane. Ring comb pick-offs 57 sense the oscillation amplitude of the ring about the Drive Axis 58. Two sets of pick-offs are used that enable differential operation to eliminate common mode noise between them resulting in signals related to the motion only. Two sets of inner sense member comb pick-offs 59 measure the output oscillation of the inner sense member relative to the outer member ring. The pick-offs are connected differentially. The comb drive and pick-off designs are shown conceptually. In reality a large number of comb fingers are used along the circumference of the members.

The gyroscope is divided into electrical regions a–g using electrical isolation spacers to enable the independent operation of the pick-offs and drives. Spacers comprise an electrical insulator that is located in between sections that preserve mechanical functionality. Spacer 60 separates two halves of the inner sense member for differential operation of the inner member pick-off. Spacers 61 isolate the inner sense member from the outer member ring to enable operation of the pick-off. Spacers 62, 63 isolate the comb drive from the ring to enable operation of the drive combs. Spacers 63, 64 isolate the outer member pick-off from the comb drive actuators. Not all spacers are identified but they are obvious from symmetry.

A surface isolation film 65 is deposited over the torsional flexures to enable conductors to pass across them to separately connect to the two halves of the inner member.

Figure 4:
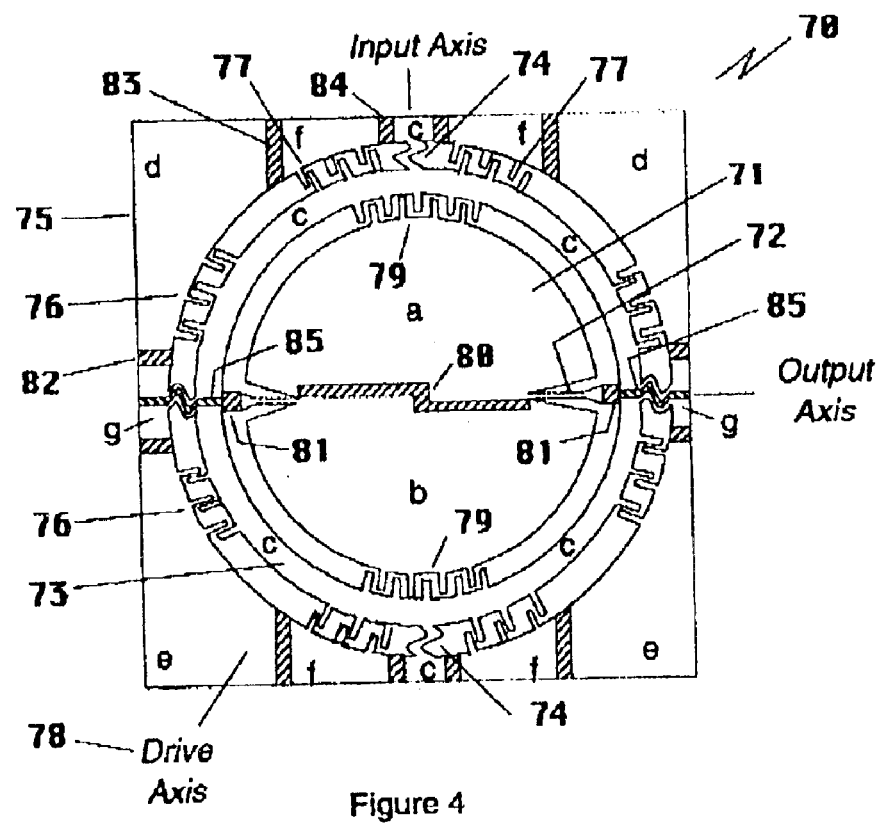
FIG. 4 is a conceptual rendition of a planar gyroscope based on the third configuration (FIG. 2c) mechanized with capacitive comb drives and comb pick-offs.

A gyroscope embodiment based on the third configuration 70 is illustrated in FIG. 4. The inner sense member 71 is connected with two torsional flexures 72 to the outer drive member 73 (ring shaped). The outer drive member is connected with four radial flexures 74 to the case 75 (at least three flexures are needed). Comb actuators 76 drive the ring to oscillate about the normal to the plane. Ring comb pick-offs 77 sense the oscillation amplitude of the ring about the Drive Axis 78. Two sets of pick-offs enable differential operation to eliminate common mode noise between them, resulting in signals related to the motion only. Two sets of inner member comb pick-offs 79 measure the output oscillation of the inner sense member relative to the outer member ring. The pick-offs are connected differentially. The comb drive and pick-off designs are shown conceptually. In reality a large number of comb fingers are used along the circumference of the members.

The gyroscope is divided into electrical regions a–g using electrical isolation spacers to enable the independent operation of the pick-offs and drives. Spacer 80 separates two halves of the inner sense member for differential operation of the pick-offs. Spacers 81 isolate the inner member from the outer member ring to enable operation of the pick-off. Spacers 82, 83 isolate the comb drive from the ring to enable operation of the drive comb actuator. Spacers 83, 84 isolate the outer member pick-off from the comb drives.

A surface isolation film 85 is deposited over two radial flexures to enable conductors to pass across them to allow connection to the two halves of the inner member.

Figure 5:
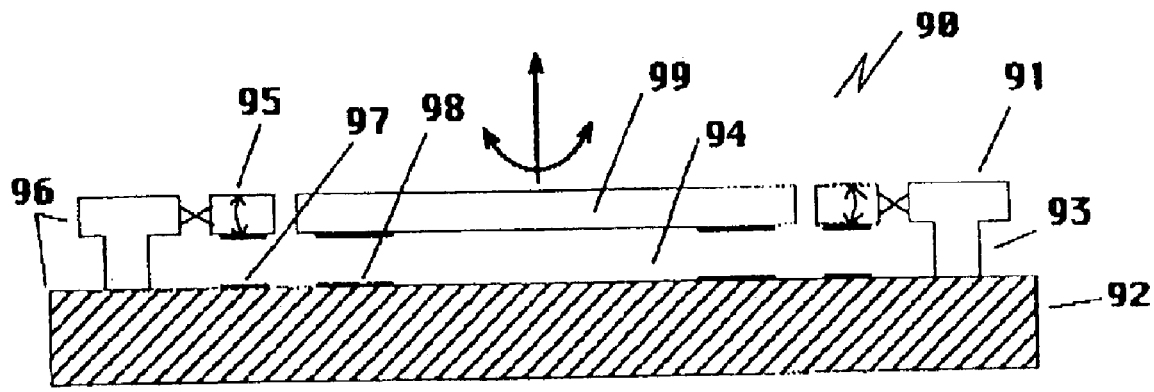
FIG. 5 is a conceptual rendition of a planar gyroscope based on the second configuration with opposing capacitive plates for the drive and pick-offs.

An embodiment of the gyroscope of the second configuration with opposing capacitive plates 90 instead of comb designs is illustrated in FIG. 5. Two layers are used: a device layer 91 and a substrate layer 92 (Pyrex in this case). The device layer is bonded to the substrate via a mesa 93 in the device layer. The mesa forms the capacitive gap 94 and allows motion of the outer member 95 in and out of the plane. The mesa and the Pyrex Layer form the case 96. One set of drive capacitive plates 97 oscillates the outer member relative to the case. A second set (not shown) is used to measure the outer member motion. A third set, pick-off plates 98 measures the motion of the inner sense member 99. In this embodiment, isolation spacers are not needed since the capacitive plates on the Pyrex Layer are isolated since Pyrex is an electrical insulator. A disadvantage of this design is that the sensed motion of the inner sense member pick-off contains the combined motions of the inner sense member relative to the outer member and relative to the case. A careful design of the inner sense member pick-off can reduce the sensed motion relative to the case, however. Surface isolation is not needed because connections are made on the Pyrex surface. An advantages of the two layer design is the flexibility to select materials and dimensions of one layer somewhat independently of the other.

An opposing capacitor plate design can be carried out where the substrate layer is of the same material as the device layer to reduce bimetallic stress. The substrate layer, however, can be made of a different thickness to add stability.

Combs and plates can be combined to actuate and sense motion of the instrument members. The combination used depends on the functionality desired.

Dynamically-Tuned Gyroscope Mechanization

Because the two resonance frequencies of the fabricated gyro may not be matched, it may be necessary to include a mechanism in the design that will allow tuning after fabrication. The approach is to shape the inner member of the gyro of the second configuration so that it has a tuning inertia like the accelerometer. After the outer member is driven to resonance, the amplitude of the outer member oscillation is varied to tune the flexure stiffness of the inner member relative to the resonance frequency of the outer member.

Dynamically-Tuned Accelerometer Mechanization

The accelerometer based on the common structure comprises a pendulum that is oscillated about the long axis of the pendulum through the use of the outer member. The oscillation dynamically tunes the stiffness of the flexures of the inner member so as to make them effectively weaker for motion of the pendulum about the Output Axis. The main benefits derived are increased accelerometer sensitivity and reduced bias instability related to the pick-off instability. The accelerometer is disclosed in U.S. Pat. No. 6,338,274, incorporated by reference herein.

Figure 6A:
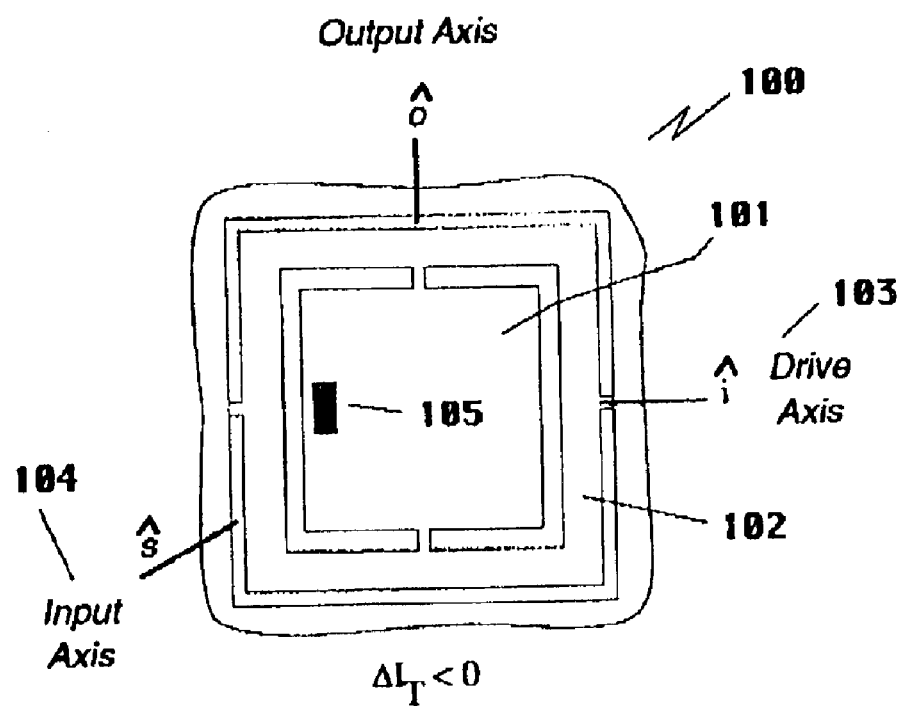
FIGS. 6a, 6b, 6c are conceptual renditions of three prospective planar accelerometers possible from the common structure.
Figure 6B:
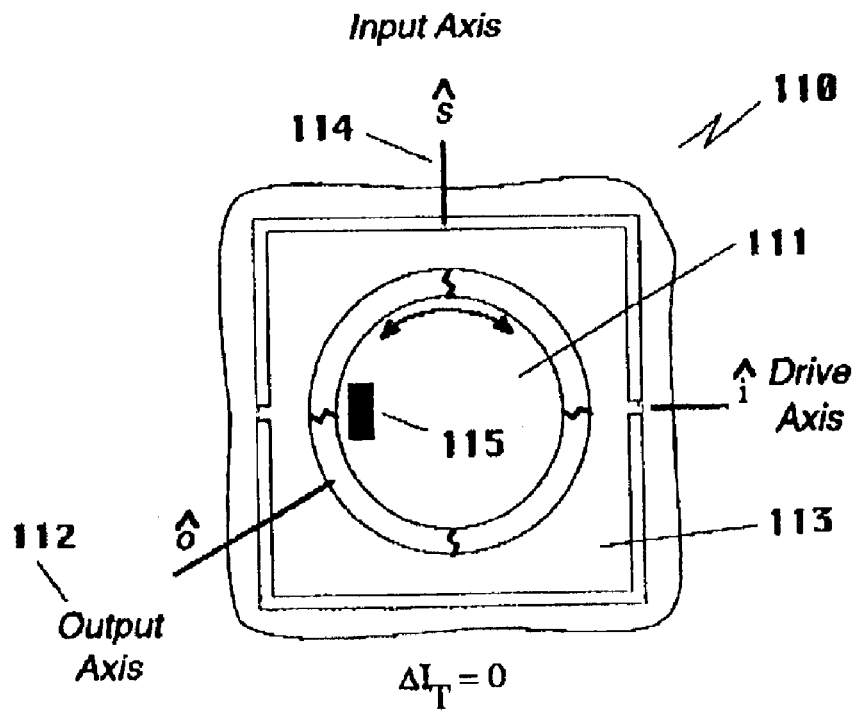
Figure 6C:
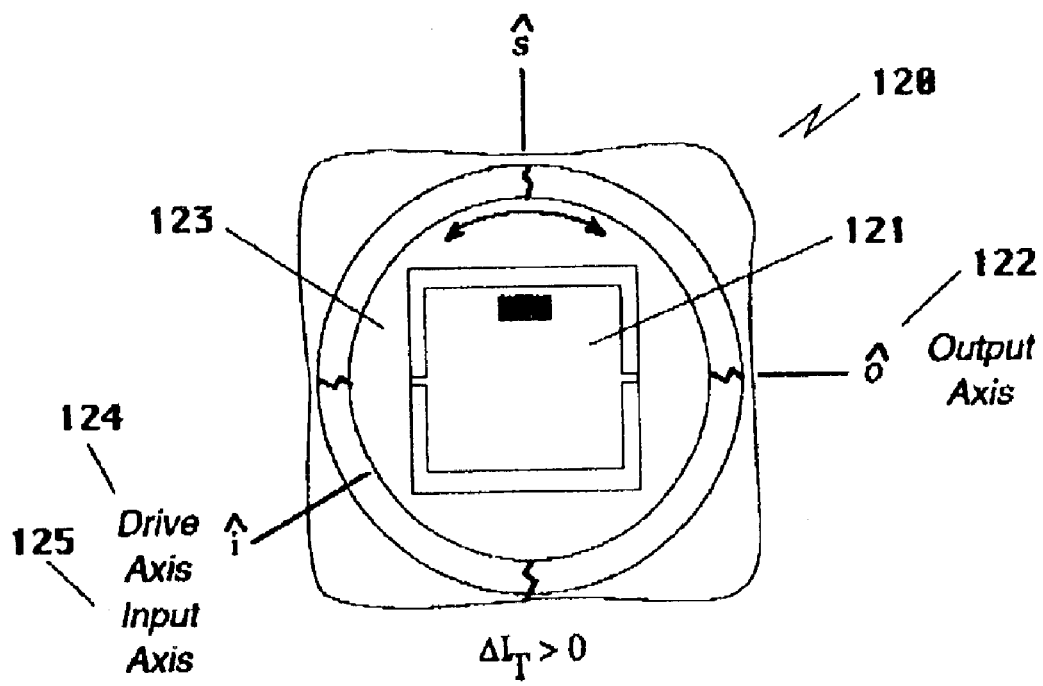

The dynamically tuned accelerometer (DTA) is obtained conceptually from the common design by adding mass to the inner sense members of the gyroscope configurations to make them pendulous as shown in FIGS. 6a, 6b and 6c. The three DTA configurations are distinguished by the Drive Axis (i), the Output Axis (o) and the accelerometer Input Axis.

For the first DTA configuration 100, FIG. 6a, the inner member 101 (pendulum) rotates out of the plane due to the action of acceleration on the pendulous mass 105. The outer member 102 is oscillated in and out of the plane about the Drive Axis 103. The accelerometer Input Axis 104 is normal to the plane. For the second DTA configuration 110, FIG. 6b, the inner member 101 rotates in the plane about the Output Axis 102 and the outer member 103 oscillates about an axis in the plane. The location of the pendulous mass 115 determines the direction of the Input Axis. The accelerometer Input Axis 104 and the Drive Axis are in the plane. For the third DTA configuration 120, FIG. 6c, the inner member 121 rotates about the Output Axis 122 in the plane and the outer member 123 oscillates about the Drive Axis 124 normal to the plane. The accelerometer Input Axis 125 is normal to the plane and aligned with the Drive Axis.

Dynamic tuning is better understood from the equation of motion after the rotational sensitivities are removed. The simpler equation of motion becomes $$I_{So}\ddot{\vartheta} + D_S \dot{\vartheta} + [K_S + \phi^{\gamma 2} \Delta I_S]\vartheta = \tau_p - \tau_{rebalance} \quad (5)$$

The bracketed term contains the sum of the flexure stiffness and the dynamic stiffness. The dynamic stiffness is given by $$K_D = \dot{\phi}^2 \Delta I_S = \frac{1}{2}\Delta I_S \omega^2 \tilde{\phi}^2 \quad (6)$$

By oscillating the inner sense member by driving the outer member with an amplitude φ and frequency ω and by setting the inner member inertias to obtain $\Delta I_S = I_i - I_s \,\,\text{\$}0$(less than zero), a negative dynamic stiffness is obtained that can cancel or lessen the flexure stiffness. $I_i, I_s$ are inertias about the i-axis and s-axis, respectively.

Figure 7:
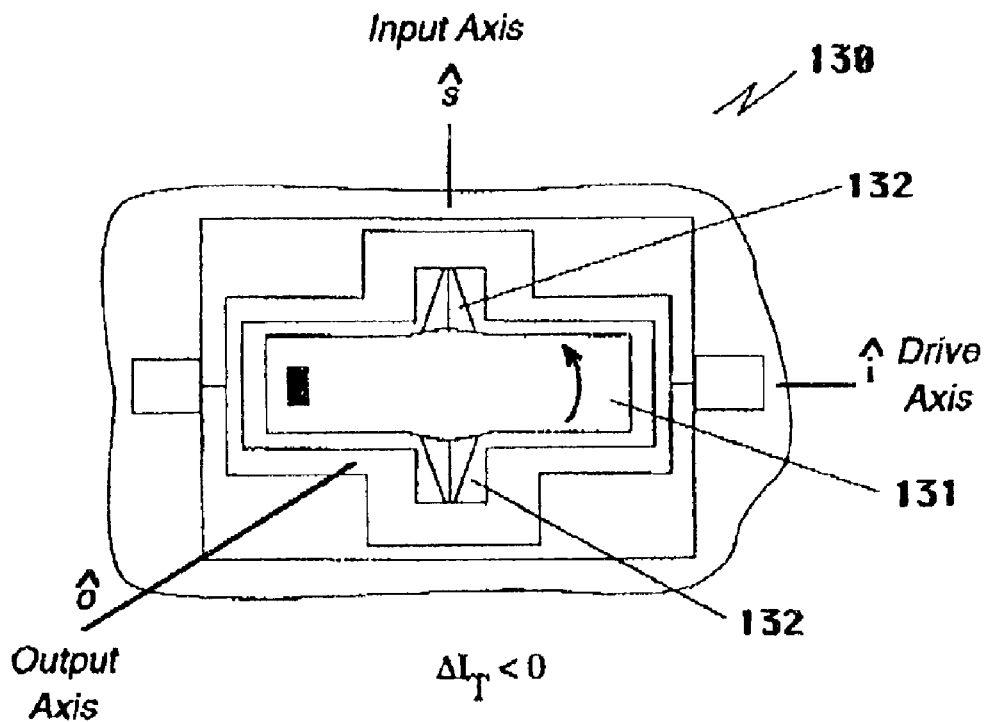
FIG. 7 is a conceptual rendition of the second accelerometer configuration (FIG. 6b) modified to enable dynamic tuning.

Not all three configurations are suitable for dynamic tuning, however, since the tuning inertia is not negative for all three. As shown in FIG. 6, only the first planar configuration satisfies the tuning inertia requirement. The second configuration can be modified to a tunable design, however, by elongating the structure along the i-axis and breaking the symmetry of the inner sense member as shown in FIG. 7. The third configuration cannot be made tunable in the planar form. It requires extension into the plane. A tunable second configuration accelerometer 130 comprises an inner sense member 131 that is not symmetric about the i-axis and s-axis. Radial flexures 132 enable the rotation of the pendulum in the plane.

It is necessary for the outer member oscillation amplitude to be held constant to maintain the accelerometer at the desired tuning level. The accelerometer is also operated closed loop otherwise an effectively weakened flexure will result in bottoming of the pendulum against stops.

Since the accelerometer is based on the same structure as the gyroscope it will have some sensitivity to rotation rate depending on how well it meets the conditions for operation of the gyroscope. Two conditions prevent the accelerometer from being a gyroscope however: the inner member resonance frequency is designed to be much lower than the outer drive member resonance frequency and the oscillation output of the inner sense member is filtered since it is sinusoidal.

Other sensitivities to rotation rates however can manifest themselves by changes in flexure stiffness, and bias torques coupled to $\Delta I_T$ as shown in Equation 1. These errors can be compensated by accelerometer measurements taken under rotation.

Multi-Sensor Mechanization

Figure 8:
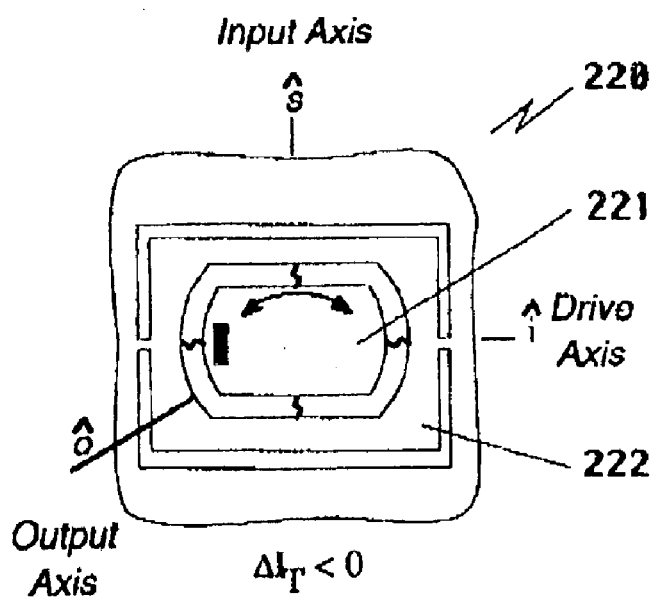
FIG. 8 is a conceptual rendition for a multi-sensor based on the common structure.

The common structure can be mechanized to form the gyro or the accelerometer as discussed above. For the proper set of conditions, one instrument can be made to sense both rotation rate and acceleration. The multi-sensor embodiment 220 is shown in FIG. 8. It combines the gyroscope second configuration with the tunable accelerometer second configuration. The key feature is an inner member 221 with the appropriate tuning inertia. Other conditions include the proper choice of flexure stiffness and inertias for the inner and outer members 222. The gyroscope function operates as the gyroscope of the second configuration but with tunability. The accelerometer operates as the accelerometer of the second configuration. The gyroscope and accelerometer outputs are separable because the gyroscope output is oscillatory and the accelerometer output is DC level.

Integrated IMU, Level 1

The integrated IMUs are planar embodiments comprising various distributions of planar gyroscopes and accelerometers having the common structure, as described above. That is, each gyroscope and accelerometer is composed of an outer member that is driven and an inner sense member that responds to either rotation rate or acceleration.

First Integrated IMU Based on the Common Structure

Figure 9A:
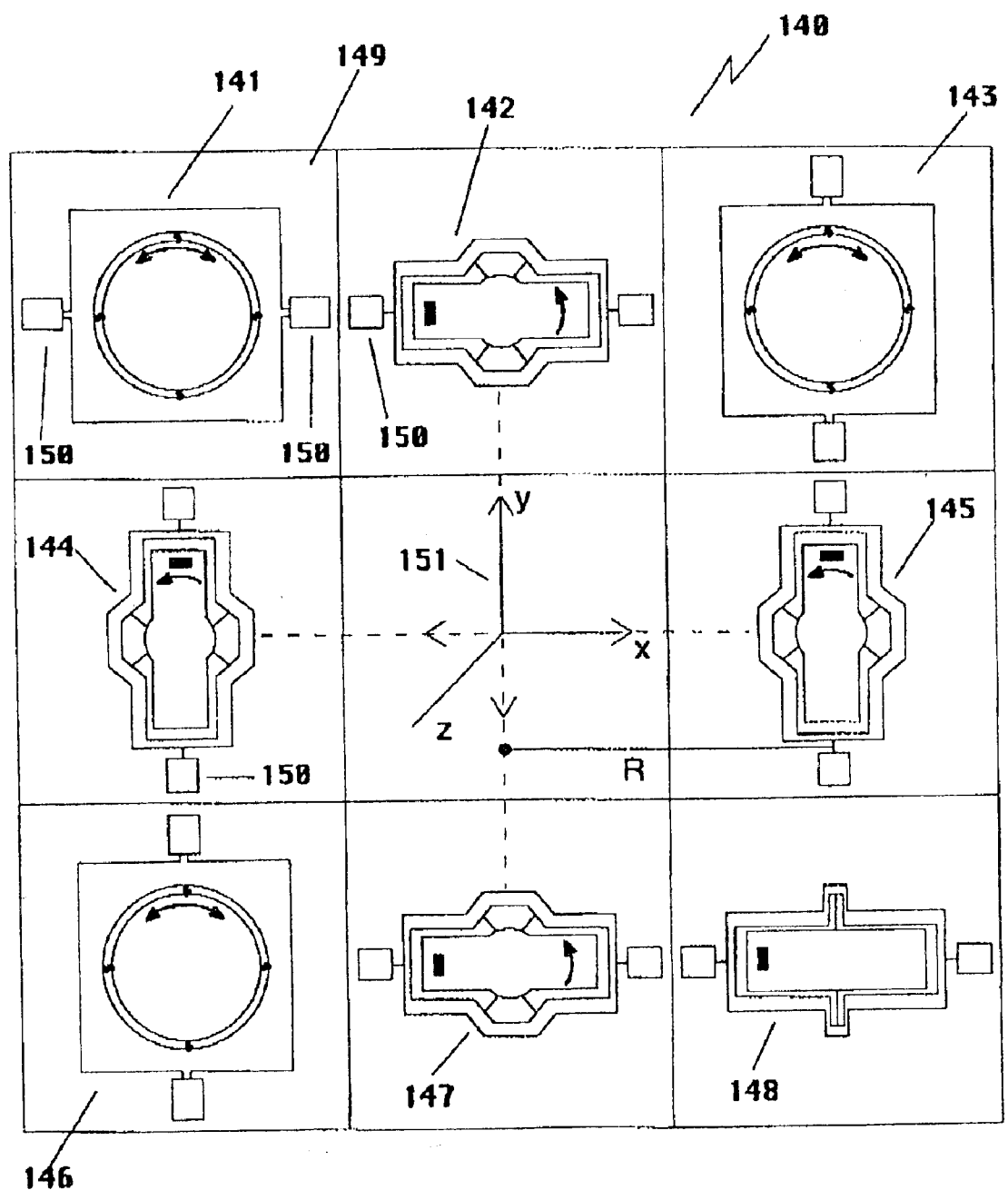
FIG. 9a is a conceptual rendition of an integrated IMU based on planar gyroscopes and accelerometers having the common structure with a first accelerometer arrangement for measuring rotation rate about the axis normal to the plane.

A first six DOF, integrated IMU embodiment 140 is based on gyroscopes of the second configuration and accelerometers of the first and second configurations as shown in FIG. 9a. These configurations are further distinguished by outer drive members that oscillate in and out of the plane. The x, y, z axes form the co-ordinate frame for the IMU. The x-axis and y-axis are in the plane and the z-axis is normal to the plane. Two gyroscopes of the second configuration are used to sense rotation rates about the x-axis and y-axis by aligning the Input Axis of the first with the x-axis and aligning the Input Axis of the second with the y-axis. These are identified as $G_x$ and $G_y$. The accelerometer of the first configuration is used to sense acceleration along the z-axis since its Input Axis is normal to the plane. It is identified as $A_z$. Two accelerometers of the second configuration are used to sense acceleration input along the x-axis and y-axis. These are identified as $A_x$ and $A_y$. To simplify the organization of the gyroscopes and accelerometers in the IMU design, each instrument is designed to occupy a square space (cell) of the same size. This allows any orientation or location of instruments in the IMU design.

The first IMU comprises nine unit cells arranged in a three by three matrix. In the first row, from left to right, are located gyro $G_y$ 141, accelerometer $A_y$ 142 and gyro $G_x$ 143. In the second row are located accelerometer $A_x$ 144, a space left for test devices and a second accelerometer $A_x$ 145. In the third row are located gyro $G_x$ 146, accelerometer $A_y$ 147 and accelerometer $A_z$ 148. Each instrument is attached to the substrate 149 by mesa structures 150 or similar structures that support the devices from the substrate so the devices are free to move. The purpose of this arrangement of instruments is to place four accelerometers, two $A_x$ and two $A_y$ in a cross configuration 151, with the accelerometers displaced an equal distance R from the IMU center. The cross configuration of accelerometers responds to the sum of linear and centrifugal accelerations. By the appropriate summing and differencing of the signals from the four accelerometers, rotation rate and linear accelerations along the two axes in the plane can be separated. The separation of signals is possible because rotation rate causes all the pendulums to rotate outwards while acceleration causes one pendulum to rotate outwards and the second to rotate inwards for each set of two accelerometers along each axis. Rotation rate $\Omega$ is related to the centrifugal acceleration by the relation $$a_{centrifugal} = \Omega^2 R \qquad (7)$$

A second benefit of the cross configuration of accelerometers is that the measurement of acceleration along the x-axis and along the y-axis can be done differentially by each set of two accelerometers. Differential operation is a means to cancel non-acceleration, common mode signals. In the first embodiment, the two y-gyroscopes can also be operated differentially.

A first variation on the first embodiment can be obtained by adding a second gyro $G_y$ in the location of accelerometer $A_z$ and moving the accelerometer into the center cell position. The result is that all instruments are placed symmetrically about the center of the IMU and all except for the z accelerometer can be operated differentially.

A second variation on the first embodiment is to use any other planar accelerometer design regardless of whether it is dynamically tunable or not.

Second Integrated IMU Based on the Common Structure

Figure 9B:
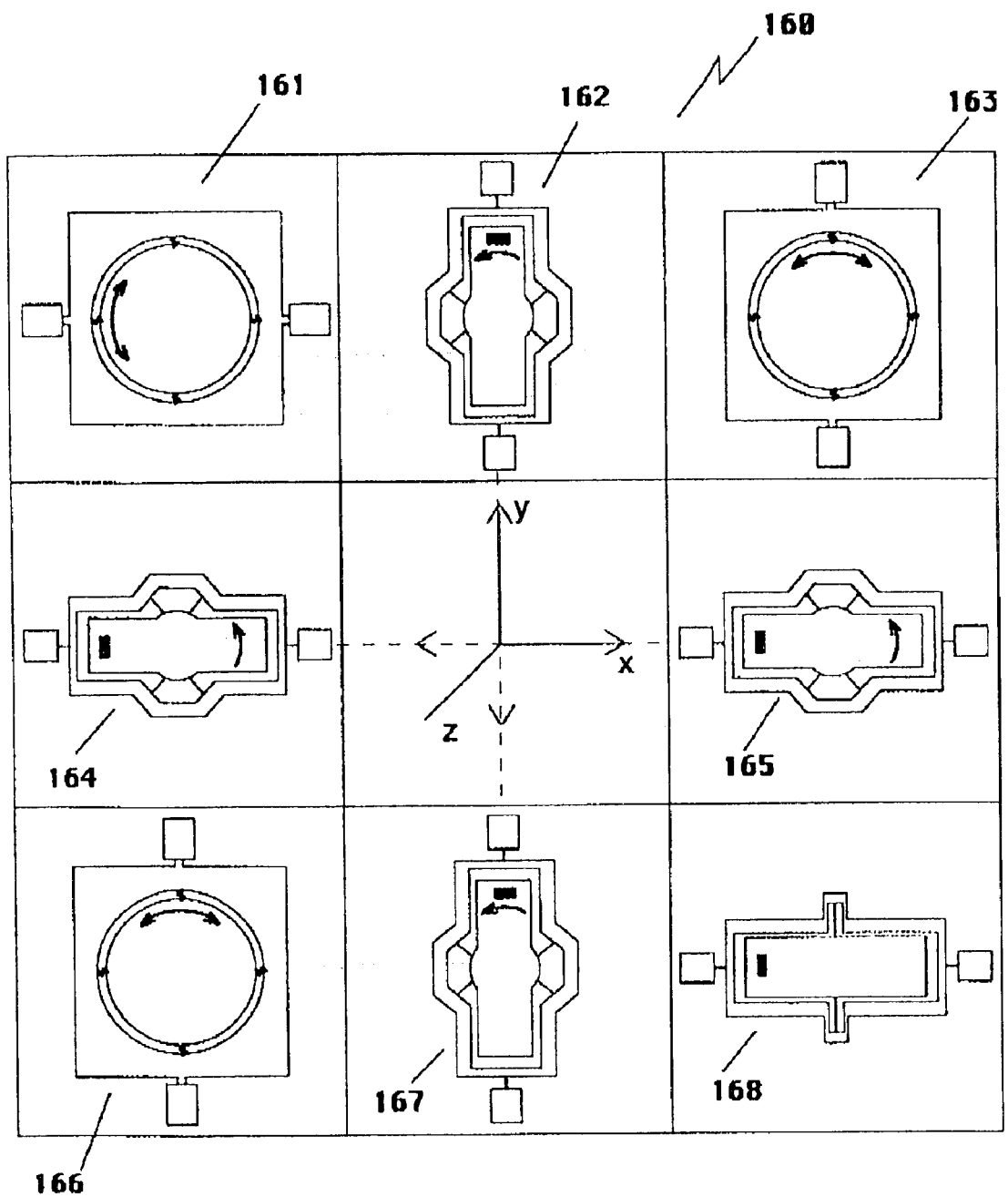
FIG. 9b is a conceptual rendition of an integrated IMU based on planar gyroscopes and accelerometers having the common structure with a second accelerometer arrangement for measuring rotation rate about the axis normal to the plane.

A second, six DOF, integrated IMU embodiment is based on gyroscopes of the second configuration and accelerometers of the first and second configurations as shown in FIG. 9b. It varies from the first embodiment by the orientation of the accelerometers in the cross configuration. The Drive Axis is oriented radially with the IMU center. In this case the accelerometers are sensitive to linear acceleration plus angular acceleration. Rotation rate is obtained by the appropriate summing and differencing of the signals from the four accelerometers. In this case, however, the rotation rate is obtained by integrating the sensed acceleration signal.

The second IMU embodiment 160 comprises nine unit cells arranged in a three by three matrix. In the first row, from left to right, are located gyro $G_y$ 161, accelerometer $A_x$ 162 and gyro $G_x$ 163. In the second row are located accelerometer $A_y$ 164, a space left for test devices and a second accelerometer $A_y$ 165. In the third row are located gyro $G_x$ 166, accelerometer $A_x$ 167 and accelerometer $A_z$ 168.

A variation on this embodiment places a second gyro $G_y$ at the location of accelerometer $A_z$ and moves the accelerometer to the central cell position.

Third Integrated IMU Based on the Common Structure

Figure 9C:
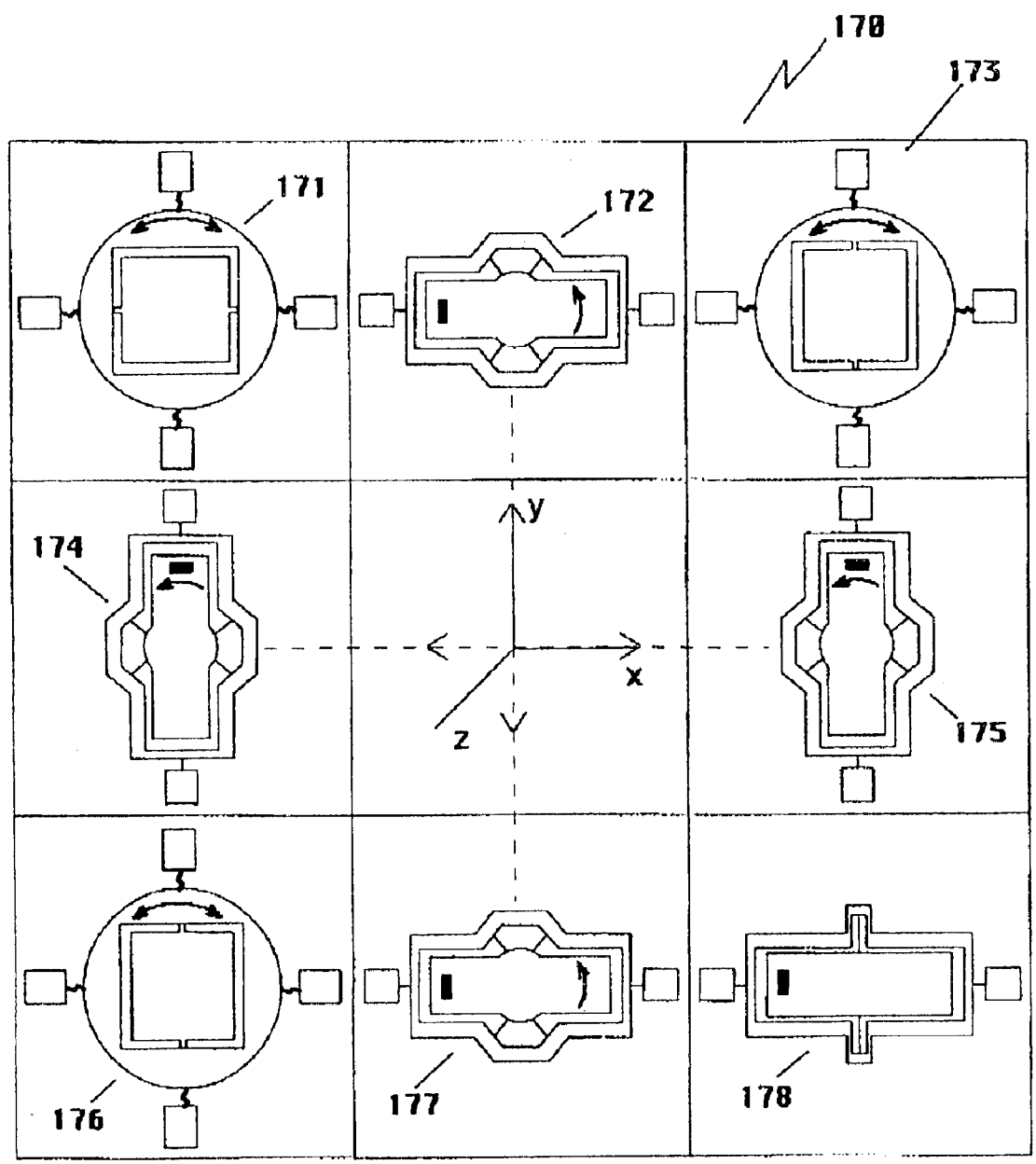
FIG. 9c is a conceptual rendition of an integrated IMU based on planar gyroscopes of the third configuration.

A third, six DOF, integrated IMU embodiment is based on gyroscopes of the third configuration and accelerometers of the first and second configurations as shown in FIG. 9c. This configuration mixes gyroscopes having outer drive members that oscillate about the normal to the plane and accelerometers with outer drive members that oscillate in and out of the plane. The x, y, z axes form the co-ordinate frame for the IMU. The x-axis and y-axis are in the plane and the z-axis is normal to the plane. Two gyroscopes of the third configuration are used to sense rotation rates about the x-axis and y-axis by aligning the Input Axis of the first with the x-axis and aligning the Input Axis of the second with the y-axis. These gyroscopes are identified as $G_x$ and $G_y$. The accelerometer of the first configuration is used to sense acceleration along the z-axis since its Input Axis is normal to the plane. It is identified as $A_z$. Two accelerometers of the second configuration are used to sense acceleration input along the x-axis and y-axis. These are identified as $A_x$ and $A_y$. To simplify the organization of the gyroscopes and accelerometers in the IMU design, each instrument can be designed to occupy a square space (cell) of the same size. This allows any orientation or location of instruments in the IMU design.

The cross configuration of the accelerometers is the same as it was for the first IMU embodiment. It senses the sum of the linear and centrifugal accelerations. The signals are separated as described for the first embodiment.

The third IMU embodiment 170 comprises nine unit cells arranged in a three by three matrix. In the first row, from left to right, are located gyro $G_y$ 171, accelerometer $A_y$ 172 and gyro $G_x$ 173. In the second row are located accelerometer $A_x$ 174, a space left for test devices and a second accelerometer $A_x$ 175. In the third row are located gyro $G_x$ 176, accelerometer $A_y$ 177 and accelerometer $A_z$ 178.

A variation on this embodiment places a second gyro $G_y$ at the location of accelerometer $A_z$ and moves the accelerometer to the central cell position.

Fourth Integrated IMU

A fourth, six DOF IMU embodiment comprises the addition of a z-gyro without the common structure. In this case all the other instruments would be common. The cross configuration would not be necessary but it would be useful for the differential operation of the accelerometers.

Instrument Sets Based on the Common Structure

Instrument sets comprise gyroscopes and accelerometers based on the common structure that are combined by sharing the outer member. Two sets are possible based on the gyroscope of the second configuration and accelerometers of the first and second configurations. All share an outer member that oscillates in and out of the plane. Instrument sets are not multisensors as one instrument does not sense both acceleration and rotation rate. The sets comprise separate instruments by virtue of the separate inner sense members that can be optimized separately.

Figure 10:
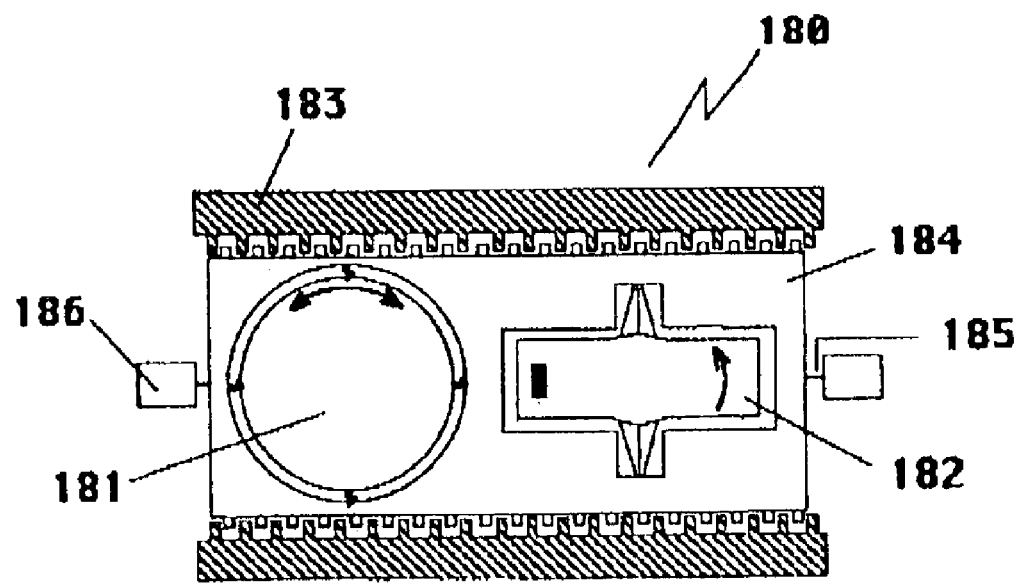
FIG. 10 is a conceptual rendition of a gyroscope and accelerometer instrument set that shares a common outer member.

The first embodiment of an instrument set 180 combines gyro $G_x$ 181 with accelerometer $A_x$ 182 or equivalently gyro $G_y$ with accelerometer $A_y$ as shown in FIG. 10. A capacitive comb drive 183 is used to oscillate the outer member 184 in and out of the plane. Separate pick-offs (not shown) are used to sense the motion of the inner members. The outer member is connected with torsional flexures 185 to the case mesa 186.

Figure 11:
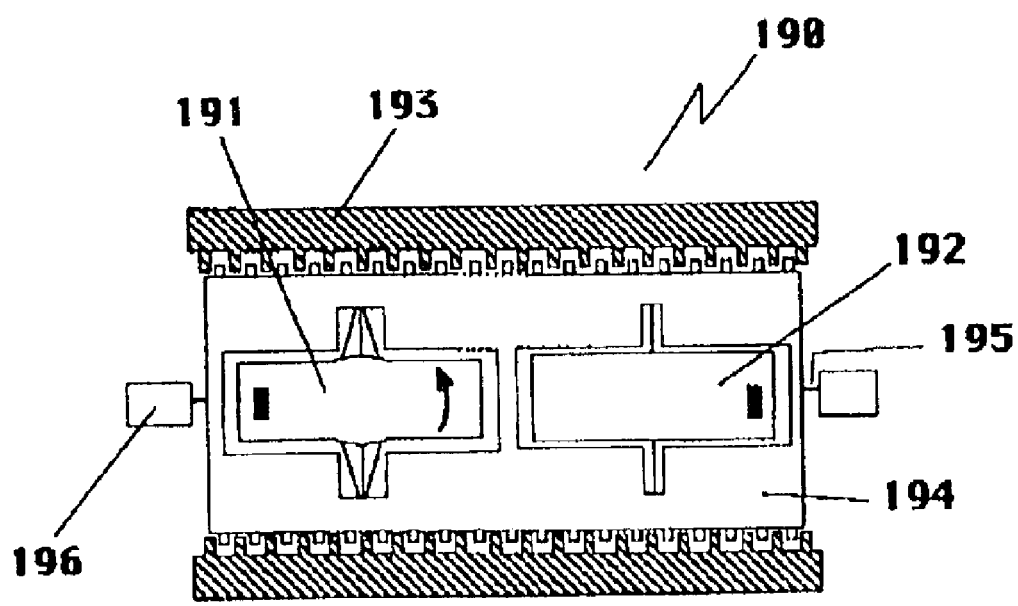
FIG. 11 is a conceptual rendition of a two accelerometer instrument set that shares a common drive member.

The second embodiment of an instrument set 190 combines accelerometer $A_x$ 191 with accelerometer $A_z$ 192 or equivalently accelerometer $A_y$ with accelerometer $A_z$ as shown in FIG. 11. A capacitive comb drive 193 is used to oscillate the outer member 194 in and out of the plane. The outer member is connected with torsional flexures 195 to the case mesa 196.

A third embodiment of an instrument set combines three instruments with a common outer member. Gyroscope $G_x$ is combined with accelerometer $A_x$ and accelerometer $A_z$ or equivalently gyro $G_y$ is combined with accelerometer $A_y$ and accelerometer $A_z$.

The significance of the gyro/accelerometer set is that the gyro sensitivity of the accelerometer to rotation is about the same axis as the gyroscope, therefore the gyro signal can be used to compensate the accelerometer for its gyro-related error. A consideration for the design of the gyro/accelerometer instrument set is that the requirements for the gyroscope and accelerometer need to be met separately.

IMU Integration, Second Level

Figure 12:
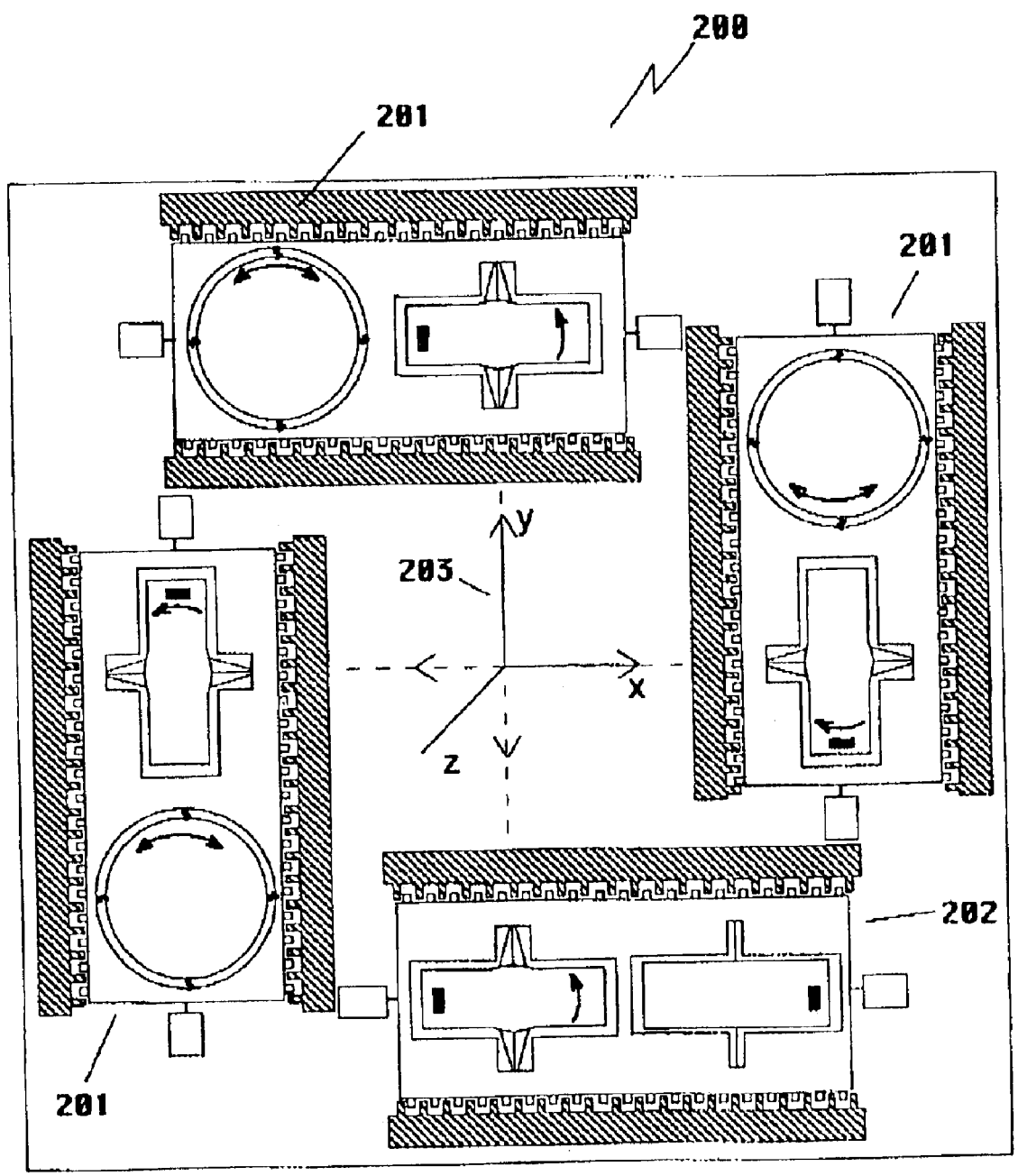
FIG. 12 is a conceptual rendition of an integrated IMU based on instrument sets.

A close inspection of FIG. 9a indicates that a second level of integration is possible if instrument sets are used. The arrangement of the instrument sets in the IMU embodiment 200 is shown in FIG. 12. Three gyro/accelerometer sets 201 and one accelerometer/accelerometer set 202 are used. Four accelerometers are arranged in a cross configuration 203 as before to enable the sense of rotation rate in addition to linear acceleration. The centrifugal acceleration mode is used.

A z-gyro can be added to the center cell to form a variation on the IMU embodiment.

A variation on the IMU embodiment uses the instrument sets so that the drive axes of all four sets are arranged radially along the x-axis and y-axis. In this case the four accelerometer configuration measures angular acceleration plus linear acceleration.

The benefits of these embodiments is the reduction of drive electronics and size.

IMU Integration, Third Level

Figure 13:
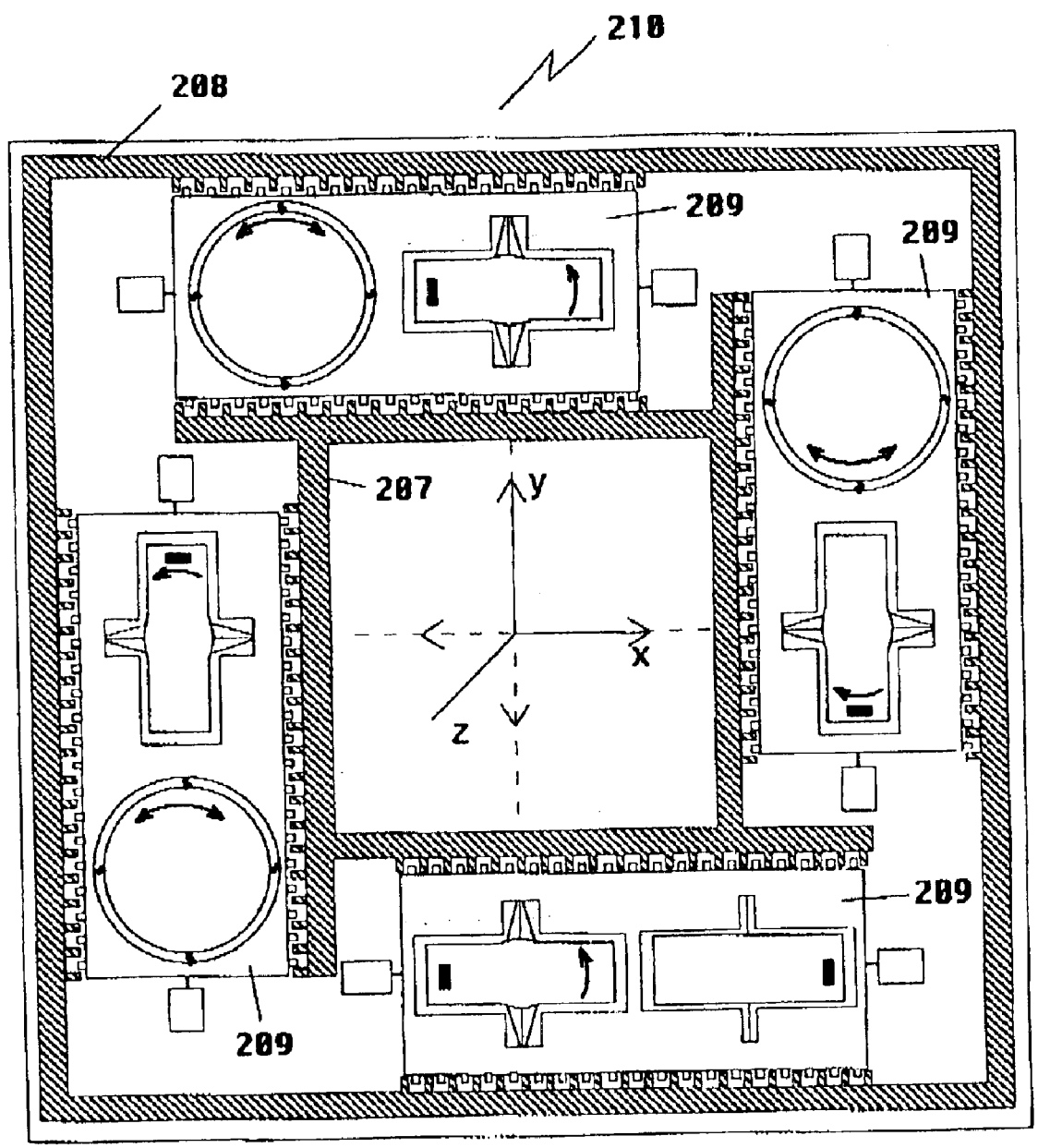
FIG. 13 is a conceptual rendition of an integrated IMU based on instrument sets that are driven by one set of drive electrodes.

An additional level of integration or perhaps simplification can be made to the embodiment described in FIG. 12 by using common drive electrodes 207, 208 to drive all the outer members 209 to form the embodiment 210 shown in FIG. 13. A consideration for this design is the drive of the four outer members at the same resonance frequency. Resonance drive is used to minimize the power needed. Tuning mechanisms may be needed for the outer members.

A benefit of this design includes one set of drive electronics for the IMU.

Fabrication Approach

The fabrication approach is described for one instrument but applies equally as well to a set of instruments fabricated at the same time on one substrate. The Dissolved Wafer Process (DWP) is representative of a typical process. The process is a good match to the requirements for the integrated IMU design that include the use of one structural material for the devices to reduce stress and warpage on the parts and to allow the fabrication of instruments on a common substrate that are separated structurally at the device level. The DWP process is representative of a transfer process in that the devices are fabricated on one substrate and transferred onto a second substrate. The advantage of the DWP is the flexibility in the choice of materials and thickness of the device and substrate layers. Low stress devices can be fabricated onto a stable rigid base layer for stability.

Figure 14:
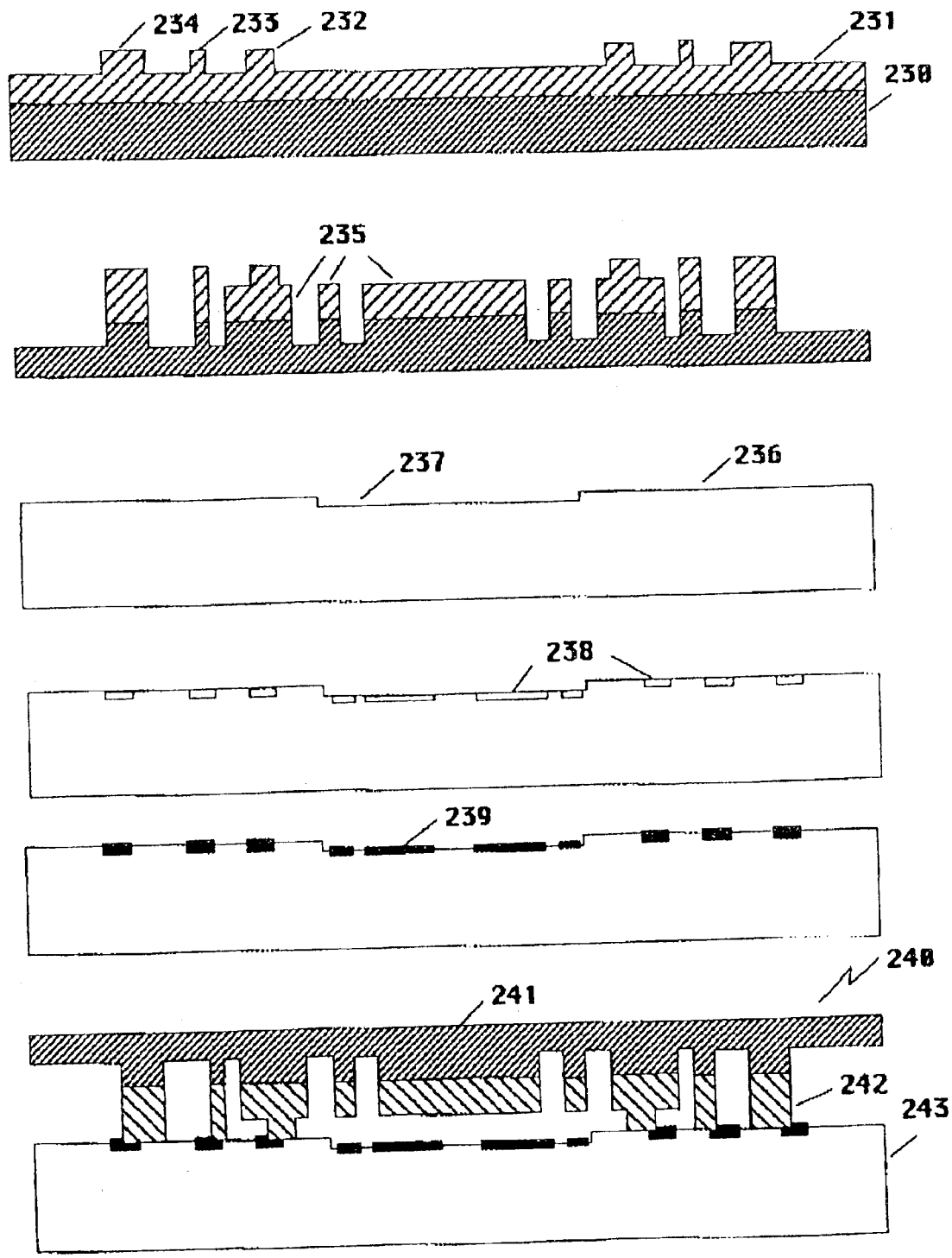
FIG. 14 is a seven step, four mask process for fabricating the above devices.

The process flow is described using five masks in FIG. 14.

Step a: The starting material is a 4" diameter silicon wafer 230 with a thickness of p++ boron diffused Epitaxial layer 231 grown on top.

Step b: Apply Mask 1 to pattern mesas 232, posts 233 and wall structures 234; plasma etch into the epitaxial layer to form them with some height. The mesa is the point of contact between the silicon wafer and the Pyrex substrate after bonding. The mesa height is selected to form the capacitive gap that allows movement of the inner and outer members. The post electrically grounds the metallizations during anodic bonding so that the voltage applied does not destroy the metallizations. The wall is formed around the full IMU. Its function is to keep the gap volume clean during cutting of the bonded wafers.

Step c: Apply Mask 2 to pattern the accelerometer structure 235: plasma etch into the epitaxial layer to form the sidewalls of the device. Etch through the full thickness of the epitaxial layer and partially into the silicon substrate.

Step d: Start the Pyrex wafer 236. Apply Mask 3 to pattern a well 237 into the Pyrex. Plasma etch to form the well. The thickness of the mesa plus the well depth make up the gap. A gap dimension is selected that prevents sticking of the device members to the Pyrex that gives good capacitive sensing and actuation.

Step e: Apply Mask 4 to pattern recessed trenches 238 in the Pyrex in preparation for metallization. Etch trenches into the glass to a suitable depth.

Step f: Deposit chromium/platinum metal film over the full wafer surface. This will deposit metal into the etched trenches formed in the previous step, extending slightly above the top of the trench. Remove the remaining resist and other metal using lift off, leaving only metal in the trenches 239.

Step g: Anodically bond the Pyrex layer to the epitaxial side of the silicon wafer 240. The devices are ready for post processing.

Post Processing

The resulting two-wafer lamination is cut to separate the IMUs. The individual IMUs are placed into chambers of a Teflon container and all immersed into a chemical EDP etch to dissolve the silicon substrate 241 leaving untouched the epitaxial structures 242 bonded to the Pyrex 243. The epitaxial structure comprises the set of devices. The IMU chips are then placed into packages and wire bonded.

What is claimed is:

1. A planar, integrated inertial measurement unit (IMU) comprising a plurality of inertial measurement instruments that are based on a common structure, the IMU comprising:

at least two coplanar inertial measurement instruments, each instrument comprising:
a case;
a planar outer member coupled to the case by flexures, and that is driven angularly to oscillate about a drive axis with respect to the case; and
a planar inner member coplanar with the outer member and coupled to the outer member by flexures, and that rotates about an output axis that is orthogonal to the drive axis in response to the acceleration or rotation rate of the IMU.

2. The planar IMU of claim 1 comprising a six degree of freedom (DOF) IMU.

3. The planar IMU of claim 2 comprising at least two gyroscopes and at least five accelerometers, all inertial measurement instruments being coplanar.

4. The planar IMU of claim 3 wherein two accelerometers are arranged to sense accelerations along a first axis in the plane of the IMU.

5. The planar IMU of claim 4 wherein two different accelerometers are arranged to sense accelerations along a second axis in the plane of the IMU and orthogonal to the first axis.

6. The planar IMU of claim 5 wherein the four accelerometers are arranged in the IMU such that their inner members are at equal radial distances from the center of the IMU, and arranged such that as a group they measure both centrifugal and linear accelerations.

7. The planar IMU of claim 5 wherein the four accelerometers are arranged in the IMU such that their inner members are at equal radial distances from the center of the IMU, and are arranged such that as a group they measure both angular and linear accelerations.

8. The planar IMU of claim 3 wherein an accelerometer is arranged to sense accelerations along a third axis that is orthogonal to the plane of the IMU.

9. The planar IMU of claim 1 wherein the outer member of two inertial measurement instruments is common, to form a multi-instrument set including two inertial measurement instruments.

10. The planar IMU of claim 9 comprising four multi-instrument sets, each such set comprising two inertial measurement instruments with a common outer member.

11. The planar IMU of claim 10 wherein three multi-instrument sets each comprise one gyroscope and one accelerometer, and one set comprises two accelerometers.

12. The planar IMU of claim 11 further comprising a common drive for the outer members of each of the sets of instruments.

13. The planar IMU of claim 11 wherein two accelerometers are arranged to sense accelerations along a first axis in the plane of the IMU.

14. The planar IMU of claim 13 wherein two different accelerometers are arranged to sense accelerations along a second axis in the plane of the IMU and orthogonal to the first axis.

15. The planar IMU of claim 11 wherein an accelerometer is arranged to sense accelerations along an axis that is orthogonal to the plane of the IMU.

16. The planar IMU of claim 1 comprising two coplanar instruments, one a gyroscope and one an accelerometer.

17. The planar IMU of claim 16 wherein the gyroscope inner member is adapted to oscillate angularly in the plane about an axis that is normal to the plane.

18. The planar IMU of claim 16 wherein the accelerometer inner member is adapted to rotate about an axis that is normal to the plane.

19. The planar IMU of claim 1 comprising two coplanar instruments, both accelerometers.

20. The planar IMU of claim 19 wherein the inner members of one accelerometer is adapted to rotate about an axis that lies in the plane of the IMU, and the inner member of the other accelerometer is adapted to rotate about an axis that is orthogonal to the plane.

21. A planar, integrated gyroscope inertial measurement instrument, comprising:
a planar case;
a planar outer member coplanar with the case and coupled to the case by flexures, and that is driven with respect to the case by integral capacitive comb drives;
a planar inner member coplanar with the outer member and coupled to the outer member by flexures, and that moves with respect to the outer member in response to the rotation rate of the gyroscope; and
comb interleaved pickoffs defined in part on the outer member and in part on the inner member, for detecting motion of the inner member relative to the outer member.

22. The gyroscope inertial measurement instrument of claim 21 wherein the outer member is driven to oscillate about an axis that lies in the plane.

23. The gyroscope inertial measurement instrument of claim 21 wherein the outer member is driven to oscillate about an axis that is orthogonal to the plane.

24. The planar gyroscope of claim 21, further comprising electrical isolation spacers that enable independent operation of the drives and pickoffs.

25. A planar, integrated inertial measurement unit (IMU) based on a common structure and comprising a plurality of inertial measurement instruments, the IMU comprising:
at least seven separate inertial measurement instruments, each inertial measurement instrument having a driven member and a sense member, wherein the sense members of all such inertial measurement instruments are separate from one another, the instruments comprising at least two planar gyroscopes and at least five planar accelerometers, all arranged about the center of the IMU;
wherein four of the accelerometers are arranged in the IMU such that their sense members are at equal radial distances from the center of the IMU, and arranged such that as a group they measure both centrifugal and linear accelerations.

26. A planar, integrated inertial measurement unit (IMU) based on a common structure and comprising a plurality of inertial measurement instruments, the IMU comprising:
at least seven separate inertial measurement instruments, each inertial measurement instrument having a driven member and a sense member, wherein the sense members of all such inertial measurement instruments are separate from one another, the instruments comprising at least two planar gyroscopes and at least five planar accelerometers, all arranged about the center of the IMU;
wherein four of the accelerometers are arranged in the IMU such that their sense members are at equal radial distances from the center of the IMU, and are arranged such that as a group they measure both angular and linear accelerations.

27. A planar, integrated inertial measurement unit multisensor, comprising:
a case;
a planar outer member coupled to the case by flexures, and that is rotationally oscillated with respect to the case in and out of the plane about a drive axis in the plane;
a planar inner member coplanar with the outer member and coupled to the outer member by a plurality of flexures, and that oscillates rotationally in the plane about an axis that is normal to the plane in response to rotation rate of the IMU multisensor; and
a pendulous mass carried by the inner member and located along the drive axis, wherein the pendulous mass rotates about an axis that is normal to the plane in response to acceleration.

28. A planar, integrated inertial measurement unit (IMU) comprising a plurality of inertial measurement instruments that are based on a common structure, the IMU comprising:

a plurality of physically separate, coplanar inertial measurement instruments, each instrument comprising:
a case;
a planar outer member coupled to the case by flexures, and that is driven angularly to oscillate about a drive axis with respect to the case; and
a planar inner member coplanar with the outer member and coupled to the outer member by flexures, and that rotates about an output axis that is orthogonal to the drive axis in response to the acceleration or rotation rate of the IMU; and
a common support substrate supporting each of the inertial measurement instruments.

29. The planar IMU of claim 28 made by a transfer process, in which the instruments are fabricated together on one surface of an instrument substrate, the instrument substrate surface is bonded to the common support substrate, and portions of the instrument substrate are removed, to leave behind the instruments.

30. A planar, integrated inertial measurement unit (IMU) comprising a plurality of inertial measurement instruments that are based on a common structure, the IMU comprising:
at least two coplanar inertial measurement instruments, each instrument comprising:
a case;
a planar outer member coupled to the case by flexures, and that is driven with respect to the case; and
a planar inner member coplanar with the outer member and coupled to the outer member by flexures, and that rotates in response to the acceleration or rotation rate of the IMU;
wherein the outer member of at least two said coplanar inertial measurement units is common.

31. The planar IMU of claim 30 comprising a six degree of freedom (DOF) IMU.

32. The planar IMU of claim 31 comprising at least two gyroscopes and at least five accelerometers, all inertial measurement instruments being coplanar.

33. The planar IMU of claim 32 wherein two accelerometers are arranged to sense accelerations along a first axis in the plane of the IMU.

34. The planar IMU of claim 33 wherein two different accelerometers are arranged to sense accelerations along a second axis in the plane of the IMU and orthogonal to the first axis.

35. The planar IMU of claim 34 wherein a fifth accelerometer is arranged to sense accelerations along a third axis that is orthogonal to the plane of the IMU.

36. The planar IMU of claim 34 wherein the four accelerometers are arranged in the IMU such that their inner members are at equal radial distances from the center of the IMU, and arranged such that as a group they measure both centrifugal and linear accelerations.

37. The planar IMU of claim 34 wherein the four accelerometers are arranged in the IMU such that their inner members are at equal radial distances from the center of the IMU, and are arranged such that as a group they measure both angular and linear accelerations.

38. The planar IMU of claim 30 wherein the outer member of two inertial measurement instruments is common, to form a multi-instrument set including two inertial measurement instruments.

39. The planar IMU of claim 38 comprising four multi-instrument sets, each such set comprising two inertial measurement instruments with a common outer member.

40. The planar IMU of claim 39 wherein three multi-instrument sets each comprise one gyroscope and one accelerometer, and one set comprises two accelerometers.

41. The planar IMU of claim 40 wherein two accelerometers are arranged to sense accelerations along a first axis in the plane of the IMU.

42. The planar IMU of claim 41 wherein two different accelerometers are arranged to sense accelerations along a second axis in the plane of the IMU and orthogonal to the first axis.

43. The planar IMU of claim 40 wherein an accelerometer is arranged to sense accelerations along an axis that is orthogonal to the plane of the IMU.

44. The planar IMU of claim 40 further comprising a common drive for the outer members of each of the sets of instruments.

45. The planar IMU of claim 30 comprising two coplanar instruments, one a gyroscope and one an accelerometer.

46. The planar IMU of claim 45 wherein the gyroscope inner member is adapted to oscillate angularly in the plane about an axis that is normal to the plane.

47. The planar IMU of claim 45 wherein the accelerometer inner member is adapted to rotate about an axis that is normal to the plane.

48. The planar IMU of claim 30 comprising two coplanar instruments, both accelerometers.

49. The planar IMU of claim 48 wherein the inner member of one accelerometer is adapted to rotate about an axis that lies in the plane of the IMU, and the inner member of the other accelerometer is adapted to rotate about an axis that is orthogonal to the plane.

* * * * *